United States Patent [19]
Mizuno et al.

[11] Patent Number: 5,299,080
[45] Date of Patent: Mar. 29, 1994

[54] FLOATING HEAD SLIDER WITH IMPROVED SUSPENSION FOR USE IN MAGNETIC/OPTICAL DISK RECORDING APPARATUSES

[75] Inventors: Osamu Mizuno, Osaka; Tohru Nakamura, Katano, both of Japan

[73] Assignee: Matsushita Electric Industrial Co., Ltd., Kadoma, Japan

[21] Appl. No.: 93,612

[22] Filed: Jul. 20, 1993

Related U.S. Application Data

[63] Continuation of Ser. No. 645,185, Dec. 27, 1990, abandoned.

[30] Foreign Application Priority Data

Dec. 27, 1989 [JP] Japan ................................ 1-344445

[51] Int. Cl.$^5$ .......................... G11B 5/48; G11B 13/04
[52] U.S. Cl. .................................... 360/103; 360/104; 360/114; 360/59; 369/13
[58] Field of Search ................ 360/103, 104, 105, 114, 360/59, 60, 102; 369/13

[56] References Cited

U.S. PATENT DOCUMENTS

| | | | |
|---|---|---|---|
| 4,853,811 | 8/1989 | Brooks, Jr. et al. | 360/103 |
| 4,896,233 | 1/1990 | Yamada | 360/104 |
| 5,079,660 | 1/1992 | Yumura et al. | 360/104 |

*Primary Examiner*—Hoa T. Nguyen
*Attorney, Agent, or Firm*—Cushman, Darby & Cushman

[57] ABSTRACT

A slider connected to a floating head assembly having a magnetic head at a tail or air flow-out end is controlled by a load beam at a position of air flow-in end via a gimbal. When the slider is brought close to a disk-shaped revolving recording medium, its posture is such that the gap at the flow-in end is wider than that at the flow-out end. An air film is rapidly formed starting from the flow-out end to provide stability and cushioning effects between the slider and the disk-shaped revolving recording medium. As a result, a soft landing due to the laminar air flow is automatically achieved.

9 Claims, 8 Drawing Sheets

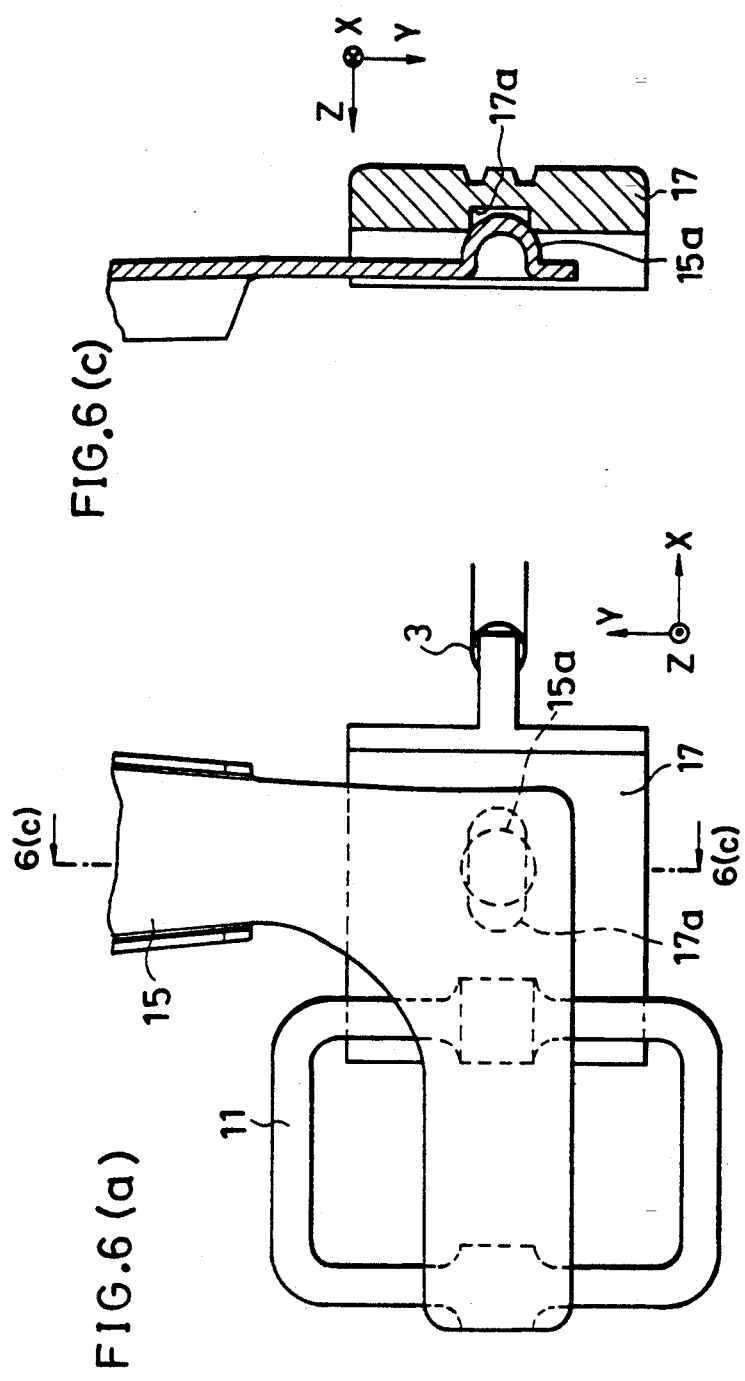
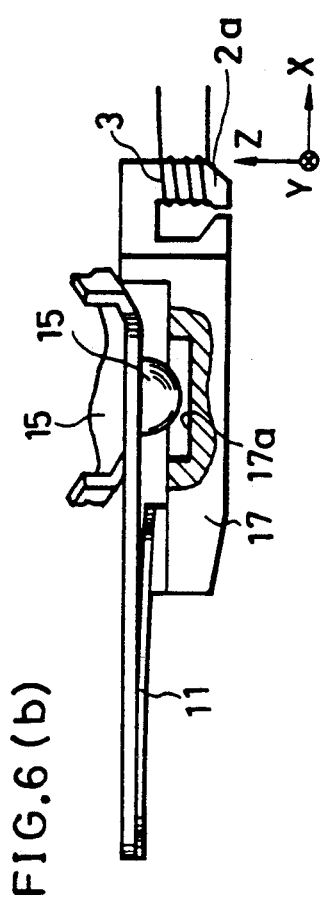
FIG.6(a)
FIG.6(b)
FIG.6(c)

FIG.8 (a) (Prior Art)
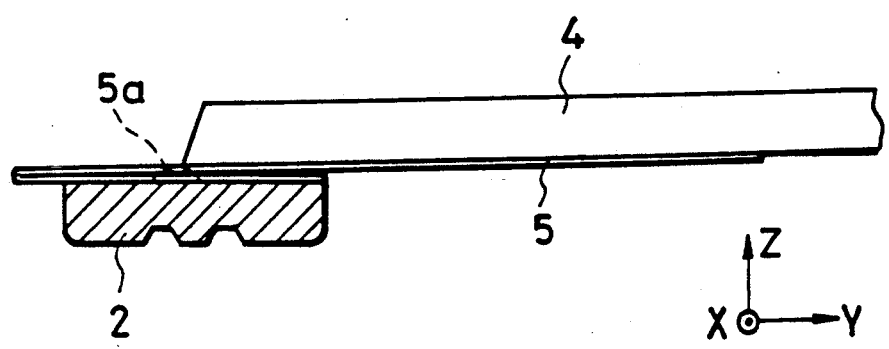
FIG.8 (b) (Prior Art)
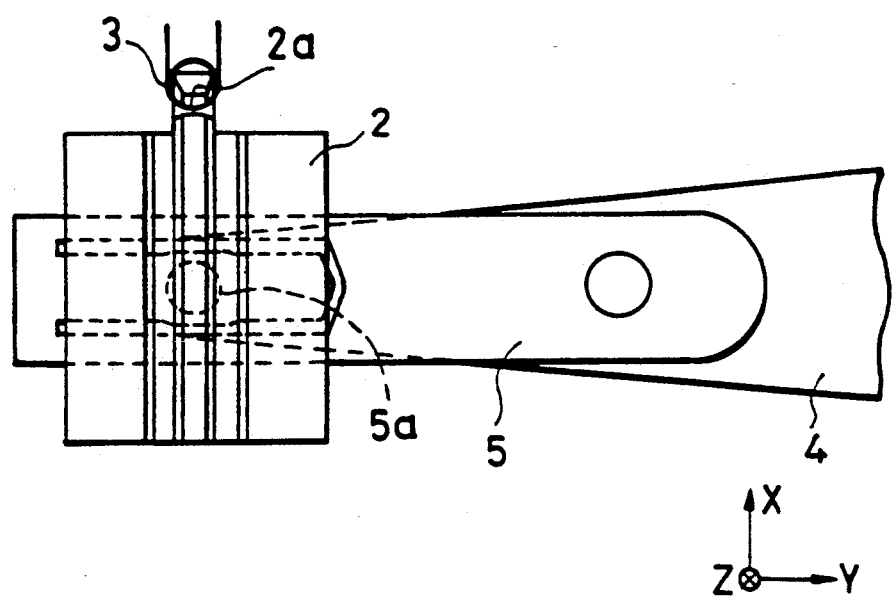

FLOATING HEAD SLIDER WITH IMPROVED SUSPENSION FOR USE IN MAGNETIC/OPTICAL DISK RECORDING APPARATUSES

This is a continuation of U.S. application Ser. No. 07/645,185, filed on Dec. 27, 1990, now abandoned.

FIELD OF THE INVENTION AND RELATED ART STATEMENT

1. Field of the Invention

The present invention relates to a floating head which is to be used in media-changeable type information recording/reproducing of magnetic disk apparatus or optical disk apparatus. Such apparatus is employed in peripheral memory apparatus of electronic computer or various information recording/reproducing apparatuses and performs information recording and reproduction keeping a given narrow relative distance with respect to a recording medium by utilizing the floating force caused by air flow.

2. Description of the Prior Art

In recent years, high density and large capacity nonvolatile memories are demanded, and rigid magnetic disk apparatuses such as external magnetic apparatuses of electronic computers are widely used. However, since in an ordinary rigid magnetic disk, its medium is not changeable, there is an inconvenience in that the cost per single information unit is high. Although apparatuses of medium changeable type are also available, their floating heads are in the form of Watrous type used with ordinary rigid magnetic disks, and are therefore not suited for a soft landing. And as for a large capacity external memory apparatus whose medium is expected to be changeable, opto-magnetic disks are recently attracting attention. For the opto-magnetic disks, although achieving a stable soft landing of floating head onto the recording medium is important, the magnitude of axial deflection which causes swaying of the surface of the medium is as much as two-orders larger as the magnitude of rigid magnetic disks, leaving many problems to be overcome.

FIG. 7 is a perspective view of one example of a conventional Watrous type floating head disclosed in Tokkai Sho 64-84486, wherein the X-Y-Z coordinate is set as shown in the figure. FIG. 8(*a*) is a partial cross-sectional view showing its principal part seen from the positive X-axis, FIG. 8(*b*) is a bottom view of the principal part seen from the negative Z-axis, and FIG's. 8(*c*) and (*d*) are side views seen from the negative Y-axis. In these drawings, a changeable disk type recording medium 1, which is shown as a cutout piece thereof and can be such as a magnetic disk or an optical disk, has a magnetic recording film in the vicinity of its surface. A multiple number of concentric or spiral recording tracks are formed on the recording film with their center at a revolution center, which is not shown in the drawing. A slider 2 has a magnetic head made of a high magnetic permeability material for performing the recording with its magnetic flux Φ and reproduction of information to or from the disk-shaped recording medium 1. The slider 2 is held keeping a freedom of sliding in the radial direction under known control. The surface of the slider 2 facing the recording medium 1 is formed sufficiently smooth so as to form an air film between this surface and the disk-shaped recording medium 1. Here, for the convenience of illustration, an end part of the negative X-axis direction of the slider 2 is termed to be a flow-in end, whereas an end part of the positive X-axis direction is termed to be a flow-out end. At the flow-out end of the slider 2, a pole 2*a* having its longer dimension in the Z-axis direction and forming a magnetic gap m thereon is provided. On the pole 2*a*, a coil 3 is wound. The slider 2 is held by a load beam 4 made of a metal, such as a stainless steel sheet. On the load beam 4, an elastic part 4*a*, a flat-shaped fixing part 4*b* for holding a stem part of the elastic part 4*a*, and a rigid part 4*c* are provided. Along the rigid part 4*c*, a bending process is applied for giving a sufficient rigidity thereon. Since the elastic part 4*a* is formed wide in the X-direction and sufficiently thin in the Z direction, only the vertical motion in the Z direction is permitted for its tip part due to a moment present around the X-axis. A pair of holes are provided on the fixing part 4*b*, and the load beam is connected to a head travel mechanism not shown in the figure with screw bolts through the above holes. Movement of the head travel mechanism is permitted only in the direction parallel to the Y-axis, and thereby the head part of the slider 2 is made to be transferable in the radial direction of the disk-shaped recording medium 1. Such movement is called "seek action". Hereupon, the end part of the load beam 4 in the negative Y-direction is called a tip. The load beam 4 and the slider 2 are abutted to a gimbal 5 at the tip of the load beam 4. On the gimbal 5, a convex surface 5*a* of a partial sphere, the convex surface being toward the positive Z-direction (upward direction), is formed at the vicinity of the center of gravity of the slider 2. Thereby the bottom surface of the tip of the load beam 4 and the gimbal 5 touch each other at the convex surface 5*a*. The gimbal 5 holds the slider 2 in a manner that its rotations with respect to the load beam 4 around the X-axis as well as the Y-axis can be kept free. Thus, the instantaneous rotation center under the above condition becomes a center of the above-mentioned contact between the convex surface 5 and the load beam 4. The gimbal 5 is made of a material which is thinner compared with that of the beam 4, and a spring constant around the Y-axis is selected to be approximately 1/20 of that of the elastic part 4*a* of the load beam 4.

Next, an explanation is given on the action of the conventional floating head constituted as described above. Now, it is assumed that, immediately after an exchanging of a disk-shaped recording medium 1 the disk-shaped recording medium 1 already keeps its revolution, and the slider 2 keeps a sufficiently large distance from the disk-shaped recording medium 1. Under this situation, in the vicinity of the slider 2, the disk-shaped recording medium 1 can be considered in a 2-dimensional model wherein it is provided to keep its movement only in the positive X-direction on the surface of the revolving disk-shaped recording medium 1. Then air adheres to the surface of the medium 1 due to the viscosity of the air, producing a laminar flow over the surface. This laminar flow has almost the same speed as that of the traveling speed of the disk-shaped recording medium 1, whereas the air flow speed with respect to the slider 2 at a position sufficiently apart from the surface of the disk-shaped recording medium 1 is negligibly small.

Now, as the slider 2 is brought sufficiently close to the disk-shaped recording medium 1 so as to make the recording action possible as shown in FIG. 8(*d*), air flows in a gap between the slider 2 and the disk-shaped recording medium 1 through the flow-in end of the slider 2, and thus the air film of the laminar flow is formed. And as the slider 2 is further brought in proximity to the disk-shaped recording medium 1, pressure along the whole of the air film, in the gap between the slider 2 and the disk-shaped recording medium 1, further rises and becomes considerably higher than the pressure of its peripheral area. An integration of distribution of pressures in the Z-direction of the air film over the bottom surface of the slider 2 forms a floating force $F_L$. The floating force $F_L$ is transferred to the tip of the load beam 4 via the convex surface 5a of the gimbal 5. This floating force $F_L$ and the arm length of the rigid part 4c (FIG. 7) of the load beam 4, form a moment. This moment acts on the load beam 4 and deforms elastically the elastic part 4a of the load beam 4 in the upward direction. As shown in FIG. 8(a), a slider load $F_B$ (FIG. 8(d)), which results from a downward restoring force caused by the above-mentioned elastic deformation, balances with the floating force $F_L$. Thus the slider 2 approaches close to the surface of the disk-shaped recording medium 1 down to a distance which is suitable to make the recording as shown in FIG. 8(d). And keeping the balance between the slider load $F_B$ and the floating force $F_L$, the slider 2 keeps stably its air-borne floating state, resulting in a completion of soft landing of the slider 2. Hereupon, it is designed that both vectors of the slider load $F_B$ and of the floating force $F_L$ pass through the center of gravity G. Under this situation, letting a current flow in the coil 3 a magnetic flux $\Phi$ (FIG. 8(d)) is produced on the slider 2 made of a material having a high magnetic permeability. Then, in the vicinity of the magnetic gap m a magnetic flux $\Phi$ which is sufficient for achieving the recording passes through the disk-shaped recording medium 1, and thereby the magnetic recording film is magnetized to complete the recording. For recording or erasing the disk-shaped recording medium 1 of an opto-magnetic disk, laser light is radiated over the magnetic recording film in the vicinity of the magnetic gap m, for raising the temperature on the magnetic film up to several hundred degrees in Celsius for lowering the coercive force. At the same time, a magnetic flux $\Phi$ is given from the pole 2a. Thus, the magnetization is kept even after cooling, and thereby a signal is recorded.

Hereupon, during the time the revolution of the disk-shaped medium 1 is maintained, axial deflection may be present. In case the axial deflection is of large amplitude or/and large period, the elastic part 4a of the load beam 4 is deformed elastically and hence the slider 2 moves vertically. This vertical motion of the slider 2 enables maintaining relative distance between the slider 2 and the disk-shaped recording medium within a specified range. In case a small amplitude or/and small period axial deflection fluctuation is present, the gimbal 5 rotates around the X-axis, as well as the Y-axis, providing a contact point between the convex part 5a and the tip of the load beam 4 at a center of their rotating motion. Thereby, the posture of the slider 2 changes and the relative distance between the pole 2a and the surface of the disk-shaped medium 1 is maintained. And during a seek action operation where the head is transferred from a track to another track, the driving force in the Y-axis direction by a transferring mechanism of the load beam 4 is transmitted from the fixing part 4b to the tip part of the load beam 4, and further it is transmitted to the gimbal 5 as well as to the slider 2, and thus, the slider is moved in the Y-direction.

In a conventional floating head as has been described above the gimbal 5 does not fix the posture of the slider 2. As a result of such unstable configuration, the posture of the slider, at the time the slider starts approaching the disk-shaped recording medium 1, is undesirably varied from time to time. Therefore, there is a possibility that the slider 2 takes a dangerous landing posture with respect to the disk-shaped recording medium 1. In particular, in the case of an opto-magnetic disk which is made of plastic materials and has a relatively low surface flatness, or in the case where, a metal base changeable magnetic disk has a surface fluctuation of large amplitude, due to dust or like foreign matter attached on a turn table which bears the magnetic disk, there is a risk that the slider takes a dangerous landing posture. For example, there is a possibility to take a posture of oblique landing as shown in FIG. 9. In such a case, there has been an inconvenience that any required air film such as described before is not formed as designed beneath the bottom face of the slider 2, and hence the slider 2 eventually crashes on the disk-shaped recording medium. When such a crash takes place, the following difficulties may arise; the first one is a case where the disk-shaped recording medium 1 is damaged and data destroyed, the second one is a case where the bottom face of the slider 2 is damaged, and the third one is a case that the gimbal breaks. Breaking of the gimbal 5 takes place as is described below: When the friction between the slider 2 and the disk-shaped recording medium 1 is sufficiently large at the time of crash, the slider 2 receives a large moment around the Y-axis. Because the gimbal 5 has a much smaller spring constant in comparison with that of the load beam 4, the gimbal 5 is largely deformed first, thereby exceeding an elastic limit and finally reaches a breaking point.

The present invention overcomes the difficulties of the conventional floating head described above; and its technical objective is to exclude a possible crash of the slider on the disk-shaped recording medium during soft landing to the and to make a specified proximity of a slider to a disk-shaped recording medium possible by forming a stable air film.

OBJECT AND SUMMARY OF THE INVENTION

The floating head in accordance with the present invention comprises:

a slider which holds a head part at least at its one part and whose bottom face faces a principal face of a disk-shaped recording medium with a small gap therebetween thereby acquiring an air borne floating force toward the direction leaving from the principal face of the disk-shaped recording medium utilizing a laminar air flow made by relative air flow beneath the bottom face from a flow-in end to a flow-out end of the slider caused by the revolution of the disk-shaped recording medium, a load beam which holds the slider and is fixed to the transferring mechanism of the head part at one end and by a part of the other end is abutted to a specified surface of the slider to give a load for the recording surface of the disk-shaped recording medium, a gimbal which is connected by its one end to an end tip part of the load beam and by its other end to one end of the slider to connect them and holds the slider flexibly so as to keep the freedom of swaying of the slider in relation to the load beam with respect to a rotation axis in a direction tangential to circular track of the disk-shaped recording medium, the part of connection between the slider and the gimbal being set closer to the flow-in end than to the center of gravity of the slider, and at the same time, with regard to the connection part a connecting point of the load beam to the gimbal being placed on the opposite side to the center of gravity, and a touch member for permitting a touch between the slider and the load beam with swaying freedom, disposed substantially on a line which passes the center of gravity and is vertical to the principal face of the disk-shaped recording medium.

According to the present invention, because the slider is held at a position close to the flow-in end via the gimbal by the load beam, when the slider is brought close to the disk-shaped recording medium, proximity to the disk-shaped recording medium is maintained, under a situation where the flow-in end is kept at a wider distance from the disk-shaped recording medium than the flow-out end. Hence, an air film is rapidly formed starting from the flow-out end. Therefore, it is not necessary to do any posture control nor speed control at the time when the slider is brought in the proximity of the disk-shaped recording medium. Therefore, making the cost of the whole apparatus more economic. Thus there is no fear that the head or the slider will crash and damage on a disk-shaped recording medium. As a result mal-operations caused by a head crash a prevented.

BRIEF EXPLANATION OF THE DRAWINGS

FIG. 6(a) is a plan view showing a principal part of a floating head of a fifth embodiment of the present invention, FIG. 6(b) is a side view showing the principal part of the floating head of the fifth embodiment, FIG. 6(c) is a cross-sectional view showing the floating head of the fifth embodiment.

It will be recognized that some or all of the Figures are schematic representations for purposes of illustration and do not necessarily depict the actual relative sizes or location of the elements shown.

DESCRIPTION OF THE PREFERRED EMBODIMENT

Figure 1A:
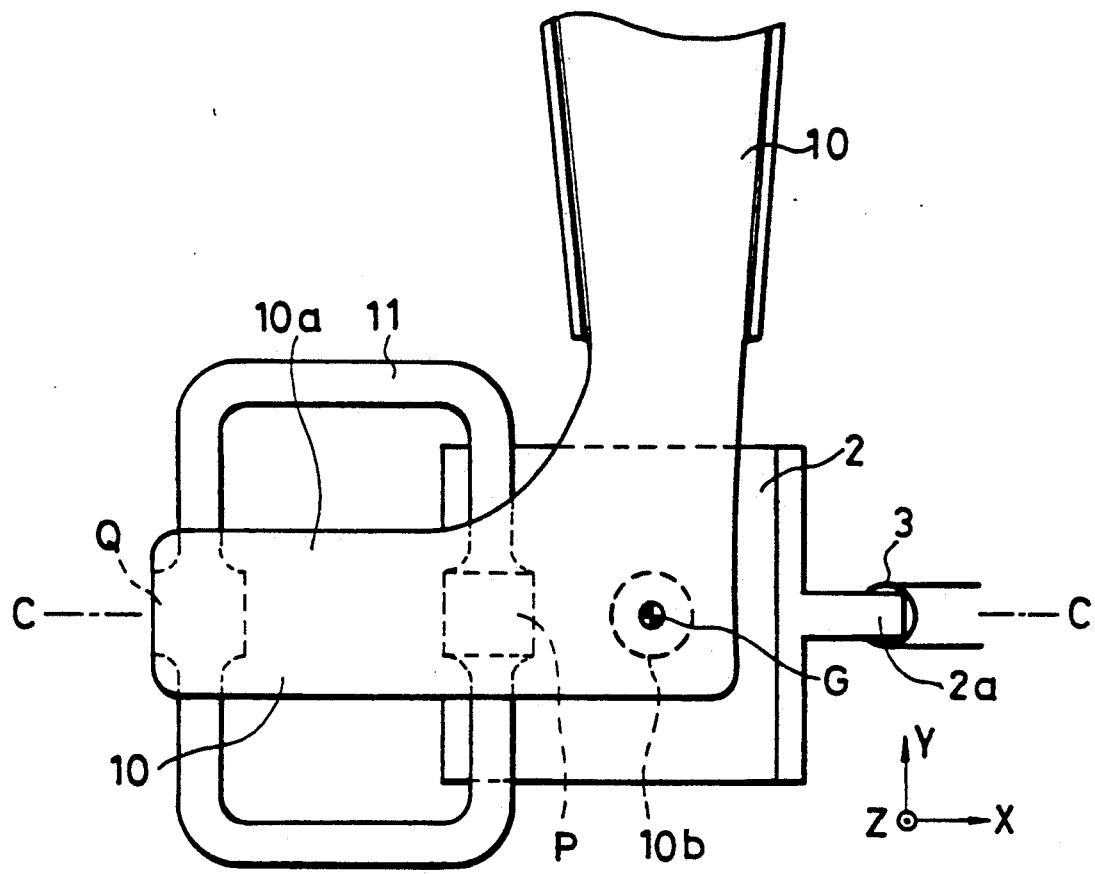
FIG. 1(a) is a plan view showing a principal part of a floating head in accordance with the first embodiment of the present invention.
Figure 1B:
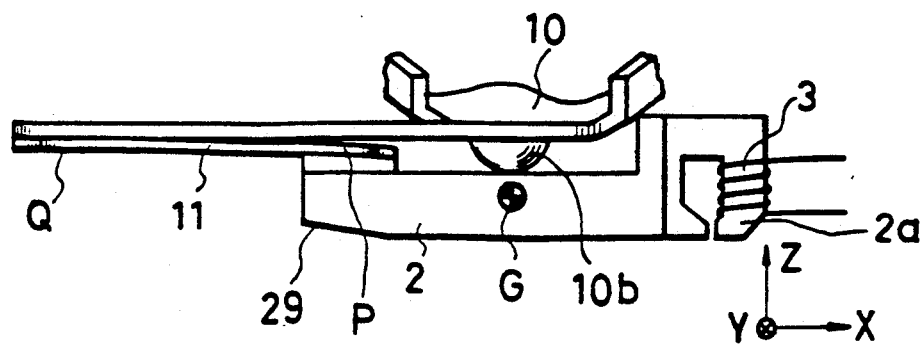
FIG. 1(b) is a side view thereof.

FIG. 1 is a plan view showing a principal part of a floating head in a first embodiment of the present invention, wherein FIG. 1(a) is its plan view and FIG. 1(b) is its side view.

In these drawings, for the same parts as those in the prior art described before the same numerals are given.

Although floating heads of the present invention can be applied for any disk-shaped recording medium, actual examples elucidated for the case of opto-magnetic recording mediums. An opto-magnetic recording film for example, of a composition containing terbium, iron, and cobalt is formed on a polycarbonate disk-shaped substrate at a thickness of 1.2 mm, by sputtering or evaporation-deposition to a thickness of about 400 Å. The opto-magnetic film is covered with an oxide film, and further with an overcoat including acrylic monomer and oligomer as its main component by applying a coating agent of X-100 sold by Sumitomo 3M Co., Japan for the purpose of protection and lubrication. On this sputtered or evaporation-deposited film, magnetic recording is processed by a magnetic head raising the temperature thereof by focusing a laser light to a spot having a diameter of about 1 μm from a rear side and responding to data to be recorded.

In the present embodiment, too, a load beam 10 having a wedge shape as a whole is formed in its oblong direction along a substantial radial direction of the disk-shaped recording medium 1, and its stem part is fixed to a transferring mechanism which is not shown in the figure. And at its other end part a bent part 10a which is bent in the L-shape from its tip is formed. This bent part 10a is formed in a manner such that it is extended toward the left side (negative X-axis direction) along a line C—C shown in FIG. 1(a). Hereupon, the left side in the drawing (negative X-direction) is taken to be a direction that is opposite to the revolution direction of the disk-shaped recording medium. And on the center line along the oblong direction of the load beam 10, a convex surface 10b, i.e. a hemispherical face, is formed such that the top of the hemispherical convex surface is toward the downward direction, i.e., toward the negative Z-axis direction. And on a tip part Q of the bent part 10a of the load beam 10, a ring-configured gimbal 11 which is symmetric with the line C—C is attached. The material, spring constant, and the function of the gimbal 11 are substantially the same as those in the conventional example described above. The slider 2 is connected at the connecting part Q, to the tip part P on the line C—C, beneath it. Here, the connecting part Q is placed at a point in the negative direction of the X-axis from the convex surface 10b, and the connecting region P is placed at a point midway between the connecting part Q and the convex surface 10b. The slider 2 is flat at its bottom surface as shown in FIG. 1(b) and a head part which includes a coil 3 is attached at one end thereof. The configuration of the head part is substantially the same as that of the prior art described before. On the negative X-axis direction of the bottom surface (on the flow-in end side) a cutout part 29 having a given slanting angle of incidence is formed as shown in FIG. 1(b). The position of the center of gravity G of the slider 2 is selected on the line C—C as shown in FIG's. 1(a) and (b). The slide 2 is constituted such that a vertical axis parallel with the Z-axis passing through the center of gravity G penetrates the lowest point of the downward convex surface 10b of the load beam 10. The gimbal 11 is constituted in a manner that, when the slider 2 receives the floating force, the upper surface of the slider 2 and the convex surface 10b provided on the bottom face of the load beam 10 make contact, whereas when any floating force does not act on the slider 2 the upper surface of the slider 2 do not make contact with the convex surface 10b and this non-contact situation is maintained.

The feature of the above-mentioned configuration is that:

The gimbal 11 has a large compliance and is connected by its one end to an end tip part Q of the load beam 10 and by its other end P to a leading or front end of slider 2 to connect them and holds the slider 2 flexibly. Thereby the freedom of swaying of the slider 2 in relation to the load beam is kept with respect to a rotation axis in a direction tangential to a circular track of the disk-shaped recording medium 1. And furthermore, the part P of connection between the slider 2 and the gimbal 11 is set closer to the flow-in end 29 than to the center of gravity G of the slider 2. At the same time, a connecting point Q of the load beam 10 and the gimbal 11 is placed on the opposite side to the center of gravity G, with regard to the connection part P therebetween. The touch member 10b is for permitting a touch between the slider 2 and the load beam 10 with a certain swaying freedom. The touch member 10b is disposed substantially on a line which passes the center of gravity G and is vertical to the principal face of the disk-shaped recording medium 1.

Figure 2A:
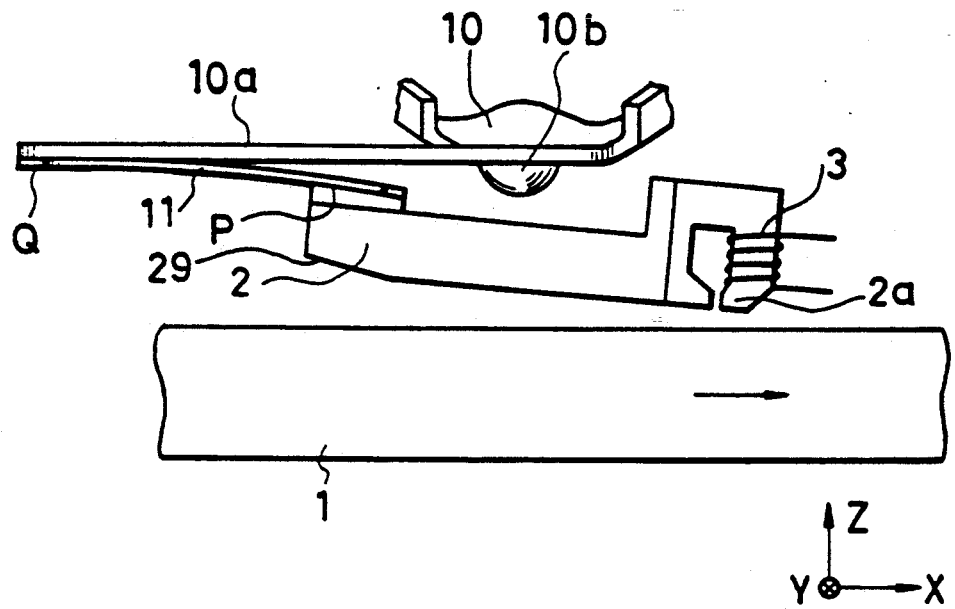
FIG. 2(a) and FIG. 2(b) are side views showing principal parts showing the operating states of the floating head in the present embodiment.
Figure 2B:
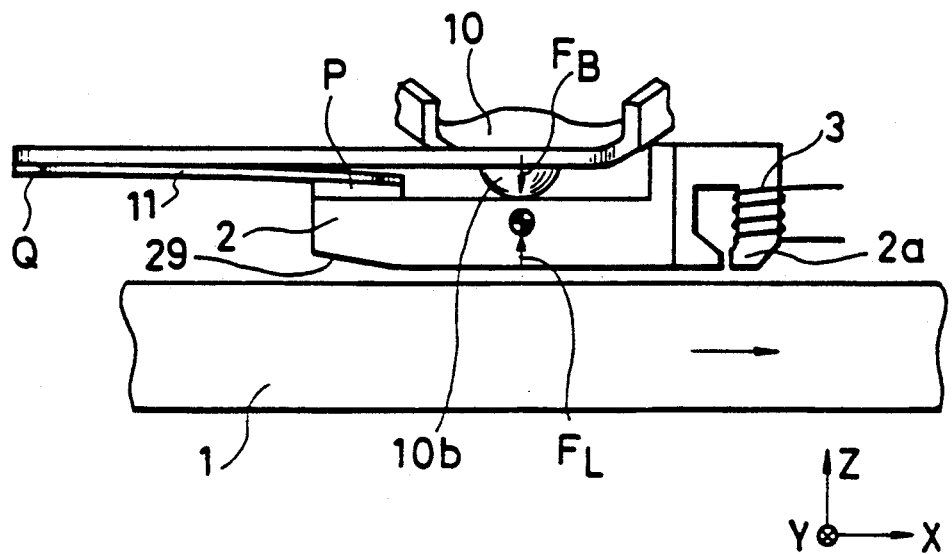

Next, elucidation is given on the operation of the floating head configured as above. FIG's. 2(a) and (b) are drawings showing the states of operation of a floating head. FIG. 2(a) shows a state where the disk-shaped recording medium 1 and the slider 2 maintained a sufficiently large distance. Under this situation, because no upward force due to a laminar flow caused by the revolution of the recording medium 1 is yet applied onto the slider 2, the downward convex surface 10b does not touch the slider 2. Consequently, the flow-out end (having a magnetic pole thereat) on the bottom surface of the slider 2 takes a closer position to the surface of the disk-shaped recording medium 1 than the flow-in end 29 does. Then, as the load beam 10 is brought to the proximity of the recording medium 1, air flows in from the flow-in end 29 of the slider 2 and an air film of laminar flow is formed. The air film becomes stable first at the flow-out end. The slider 2 is fixed only at the connecting part P which is present in the vicinity of the flow-in end 29. The spring constant of the gimbal 11 is selected as small as about 1/20 of that of the elastic part of the load beam 10. Furthermore, the slider 2 is light weight and also its unspringed weight is small. Thus the slider 2 starts to float responding sensitively to the floating force due to the air film. Therefore, the probability that the slider 2 crashes on the disk-shaped recording medium 1 becomes very small. As the slider 2 comes further closer to the recording medium 1, this slider 2 is further stabilized over the whole surface facing the disk-shaped recording medium 1. Then finally, the head part of the slider 2 completes its proximity movements up to a distance through which the recording is sufficiently possible as shown in FIG. 2(b). The convex top surface 10b touches on the upper surface of the slider 2, and hence, the slider load $F_B$ and the slider floating force $F_L$ maintaining a balance via the convex surface 10b. Thereby the slider floats stably above the recording medium 1 with a specified gap, thus making the slider 2 complete its soft landing action. At this time, both the load $F_B$ and the floating force $F_L$ pass through the center of gravity G. Accordingly, even in the case where there is disturbance in the Z-axis, the inertia acting on the slider 2 is canceled out by the load $F_B$ and the floating force $F_L$. Hence any moment around the X-axis and Y-axis cannot be produced, and thereby floating of the head is provided stably.

If there is an axial deflection of a long period on the disk-shaped recording medium 1, in the same manner as in the conventional floating head the elastic part of the load beam 10 is deformed. Thereby the distance between the slider 2 and the recording medium is maintained. For an axial deflection of shorter period, the gimbal 11 is deformed, and the slider 2 rotates around the X-axis as well as the Y-axis, making contact between a lowest or top point of the downward convex surface 10b and the upper face of the slider 2 at an instantaneous rotation center. Thereby the relative distance with respect to the recording medium is maintained.

An important feature of the embodiment shown in FIG. 2 is that, the touch member 10b is disposed substantially on a line which passes the "center of air-borne floating force FL" and is vertical to the principal face of the disk-shaped recording medium 1.

In the present embodiment, since the downward hemispherical convex 10b is to touch the upper face of the slider 2 as shown in FIG. 2(b), the distance in the Z direction between the center of gravity G and the instantaneous rotation center becomes small. Accordingly, even when the rotation around the X-axis or/and around the Y-axis with the hemispherical convex 10b serves as a rolling fulcrum, the moment acting on the slider 2 caused by the motion of the translational disturbance in the XY-plane is small. Consequently, the stability of the motion of the slider 2 against the disturbance is improved.

Even if, by chance, the slider 2 crashes on the disk-shaped recording medium 1 during its approaching motion, the contact position of the slider 2 is at its rear part. Then, since the gimbal 11 receives a pulling load only instantaneously, the gimbal 11 is safe from the damage caused by its twisting or bending. And, because the slider 2 is constrained only at its tip part, the slider 2 leaves immediately from the disk-shaped recording medium 1, even only under a small amount of impact. Thus, neither the slider 2 nor the disk-shaped recording medium 1 is fatally damaged.

In the case of a seek action operation where the head moves from track to track, as in a conventional head, the driving force parallel with the Y-axis direction is transmitted from the load beam 10 to the gimbal 11 as well as to the slider 2. Thereby the slider 2 is moved in parallel with the Y-direction such that the action is performed repeatedly.

Figure 3:
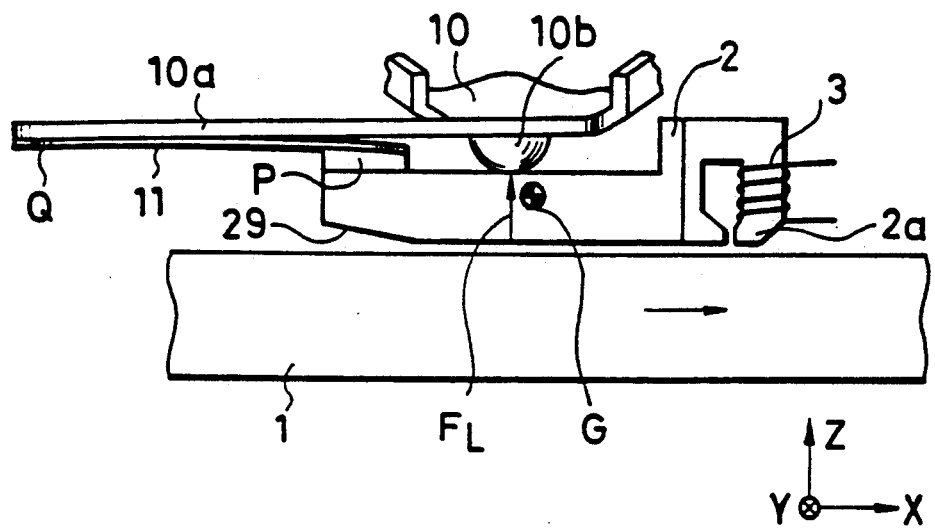
FIG. 3, FIG. 4, and FIG. 5 are side views showing principal parts of floating heads respectively of a second embodiment, a third embodiment, and a fourth embodiment of the present invention.

FIG. 3 is a drawing which shows a principal part of a floating head in a second embodiment. Corresponding parts and components to the first embodiment are shown by the same numerals and marks, and the description thereof made in connection with the first embodiment similarly applies. Differences and features of this second embodiment from the first embodiment are as follows. In this second embodiment, although, material, spring constant, and shape of gimbal 11 are similar to those of the first embodiment, its length in the direction parallel with the X-axis from a point of contact of the hemisphere top 10b with the upper surface of the slider 2 to the magnetic head 3 on the right-hand side is formed to be slightly longer. In this case, under the situation that the slider 2 completes its soft landing action, for the gimbal 11, a vector of the slider load $F_L$ acting on the slider 2 from the contact point with the slider 2 passes through a point closer to the gimbal 11 than to the center of gravity G as shown in FIG. 3.

Then, if the relative speed of the disk-shaped recording medium 1 is changed from that in the first embodiment, the floating force $F_L$ does not pass through the center of gravity G but it passes through the bottom-most point of the downward convex surface 10b. According to this second embodiment, in a case where the floating force is large and also the convex surface 10b supports the vicinity of the center of gravity G, or even in a case where there is a fear that the posture of the slider 2 will excessively lean owing to a moment around the contact point between the downward convex surface 10b and the upper surface of the slider 2, such excessive leaning is prevented and the posture safely maintained. That is, by displacing the acting point of the floating force $F_L$ a little from the center of gravity of the slider 2, even when the floating force is large, the distance between the slider 2 and the disk-shaped recording medium 1 is maintained so as not to exceed a specified range, thereby assuring the stability improvement.

Hereupon, in this second embodiment, although the contact point between the convex surface 10b and the slider 2 is slightly shifted toward the flow-in end 29, from the center of gravity G of the slider 2, it is also possible to shift it the other way toward the flow-out end in order to make the floating force $F_L$ provide support at the contact point. And in order to shift the contact point, instead of changing the shape of the gimbal 11, it is also possible to change the shape of the load beam 10 or to change the position of the range in which the load beam 10 and the gimbal 11 are fixed.

Figure 4:
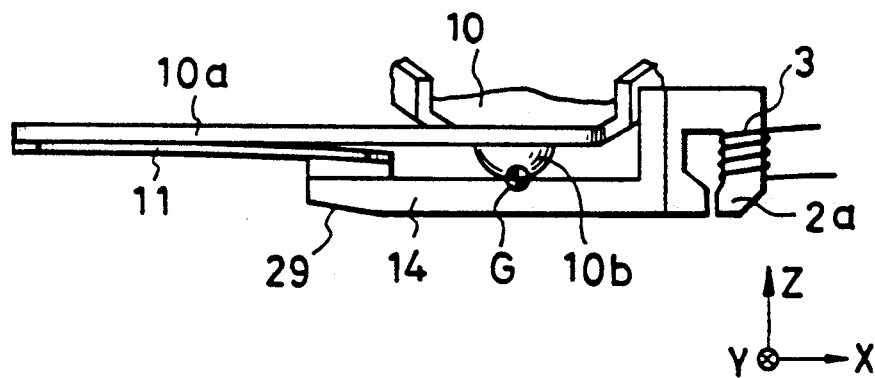

FIG. 4 is a drawing which shows a principal part of a floating head of a third embodiment. Corresponding parts and components to the first embodiment are shown by the same numerals and marks, and the description thereof made in connection with the first embodiment similarly applies. Differences and features of this third embodiment from the first embodiment are as follows. In this third embodiment, the slider 14 is formed thin, and the center of gravity thereof is placed on the surface of the slider 14, and the contact point between the top of the hemispherical convex face 10b and the slider 14 is disposed just above the center of gravity. As a result, the instantaneous rotation center and the center of gravity G coincide with each other. Consequently, even when a rotation force takes place around the X-axis and/or Y-axis with the hemispherical convex 10b serving as a rolling fulcrum, translational disturbances in the X-Y plane of the slider 2 will hardly make any moment on the slider 14. Therefore, particularly in a seek action, operation floating stability of the slider is much improved.

Figure 5:
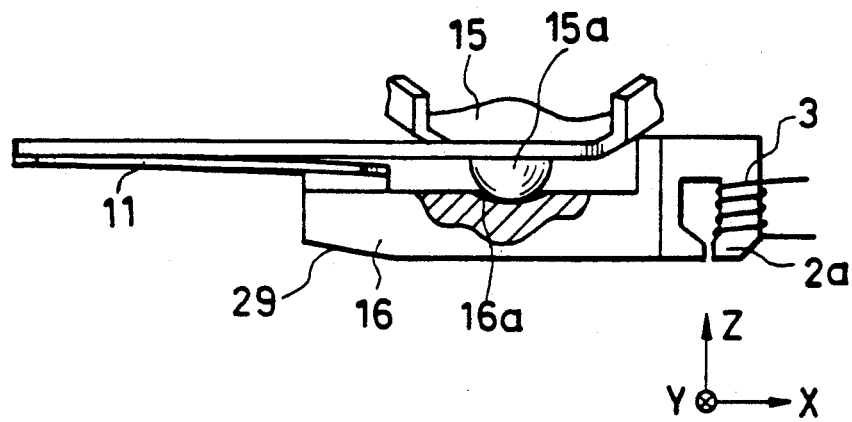
Figure 7:
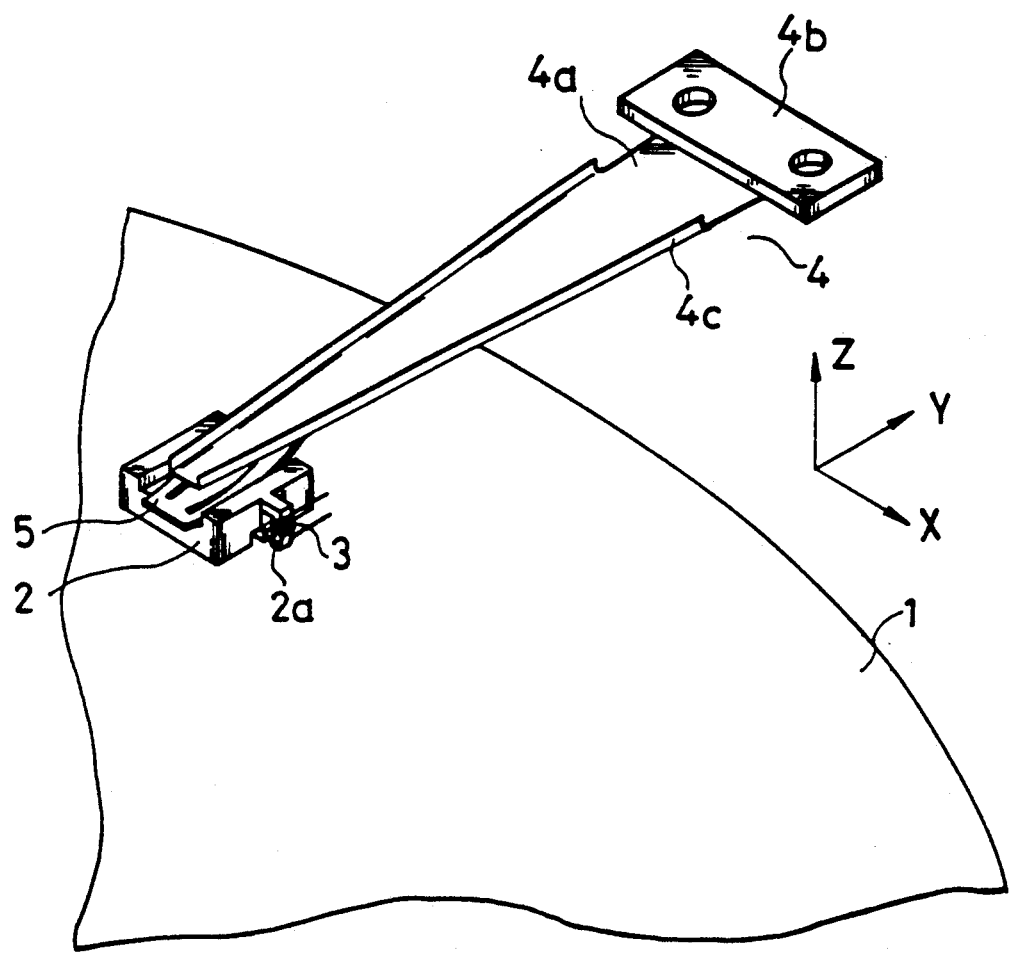
FIG. 7 is a perspective view showing a conventional floating head.
Figure 8C:
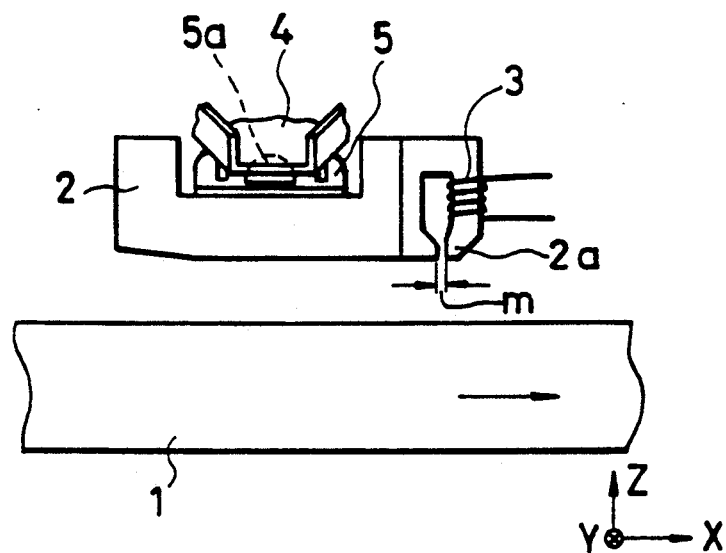
FIG. 8(a) is a rear view showing a principal part of the conventional floating head.
FIG. 8(b) is a bottom view showing a principal part of the conventional floating head, FIGS. 8(c) and (d) are side views of the principal part showing respective operating states of the conventional floating head.
Figure 8D:
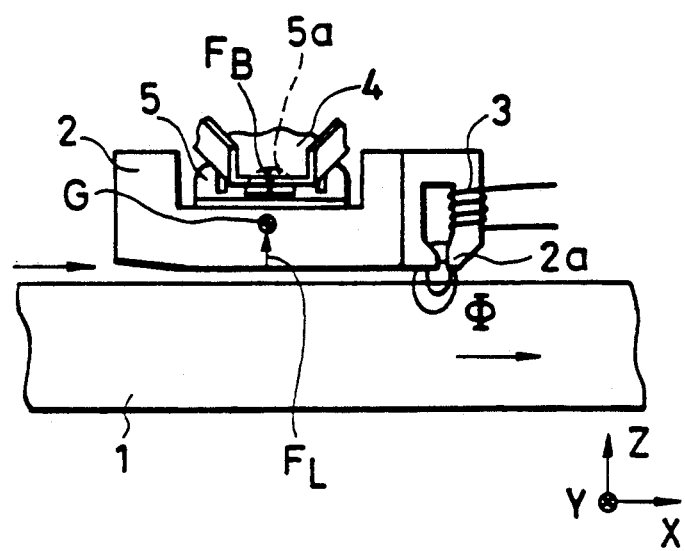
Figure 9:
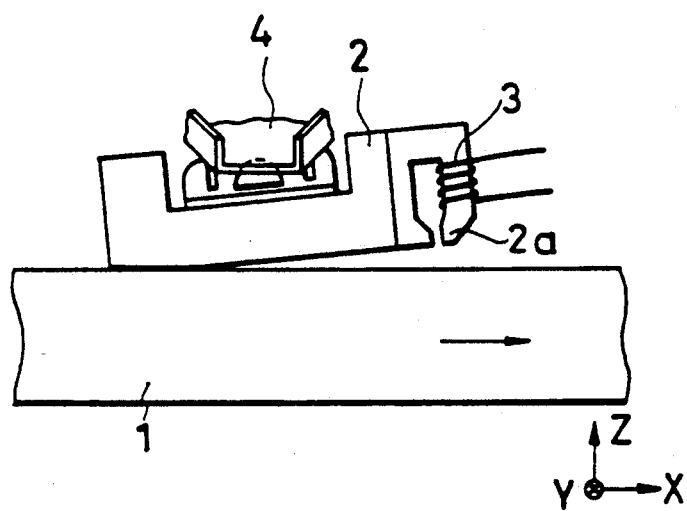
FIG. 9 is a side view of a principal part showing an operating state of the conventional floating head.

FIG. 5 is a partly cutout view showing the principal part of a floating head of a fourth embodiment. Corresponding parts and components to the first embodiment are shown by the same numerals and marks, and the description thereof made in connection with the first embodiment similarly applies. Differences and features of this fourth embodiment from the first embodiment are as follows. In this fourth embodiment, the radius of the hemispherical convex face 15a formed downward on the load beam 15, is designed larger than that of the convex surface of the first embodiment, and a concave surface 16a is provided on the upper surface of the slider 16 at a point corresponding to the convex surface 15a. This concave surface 16a is designed to be a part of a hemispherical concave, and its curvature is selected slightly smaller than that of the convex surface 15a. During soft landing of the slider, the concave surface 16a and the convex surface 15a make their mutual contact as a point contact. By constituting the head as described above, at the state of completion of the soft landing the convex surface 15a gets into the concave surface 16a. As a result of such constitution, a restoring force exits at the deviation from the balancing point between the slider 16 and the load beam 15. Accordingly, the resistivity against the translational disturbances in the X-Y plane can be improved largely. This constitution can exhibit its effectiveness for those cases where the gimbal 11 has a low rigidity in a direction parallel with the Y-axis and where a high-speed seek action is required.

FIG. 6 is a drawing which shows a principal part of a floating head of a fifth embodiment.

Corresponding parts and components to the first embodiment are shown by the same numerals and marks, and the description thereof made in connection with the first embodiment similarly applies. Differences and features of this fifth embodiment from the first embodiment are as follows. FIG. 6(a) is a top view, FIG. 6(b) is a partly cutout view seen from the negative Y-axis direction, and FIG. 6(c) is a cross-sectional view along a J—J cut line seen from the negative X-axis direction. In these figures, the gimbal 11 is the same as that in the first embodiment. And the load beam 15 is the same as that shown in the fourth embodiment, and a downward convex surface 15a is formed on the surface on which this slider is abutted. In the embodiment, the slider 17 has a narrow oblong groove 17a which is formed as shown in the figure on the surface to which the convex surface 15a makes contact. The groove 17a is formed in a manner having its oblong dimension in the X-axis direction, i.e., in the direction which is tangential with respect to the circular recording tracks of the disk-shaped recording medium. As a result, the convex surface 15a abuts with the edges on the Y-axis direction.

According to the constitution as has been described above, its operation is almost similar to that in the fourth embodiment. This fifth embodiment has no balancing-point restoring force against a translational disturbance in the direction parallel with the X-axis, but it has a particularly large restoring force against a translational disturbance in the direction parallel with the Y-axis. Therefore, this fifth embodiment is particularly effective for such cases where a high stability for the slider is required in a high-acceleration seek action operation. Also, the narrow oblong groove 17a is easy to manufacture and more economical in comparison with concave face design e.g. the hemispherical concave face of the fourth embodiment (FIG. 5).

Hereupon, in this fifth embodiment, although the convex surface 15a is held by the edge part of the groove 17a as is shown in FIG. 6(c), it is also possible to make the edges round in place of the sharp edges to hold the convex surface 15a by its surface. In this condition, the relative rotational motion between the slider 17 and the load beam 15 can be achieved with yet further smoothness.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A floating head assembly comprising:
   a slider having:
   at least a leading end connected to a recording head; and
   a bottom surface facing a recorded surface of a disk-shaped recording medium,
   a small gap being provided therebetween from which an air-borne floating force is generated in a direction which extends from the recorded surface toward said bottom surface,
   the air-borne floating force being generated by laminar air flow caused by the revolution of said disk-shaped recording medium, and extending in a direction from a flow-in end to a flow-out end beneath the bottom surface and over the recorded surface,
   said flow-in end being defined with respect to a first end of said bottom surface where the laminar air flow first makes contact with the slider, and
   said flow-out end being defined with respect to a second end of said bottom surface where the laminar air flow exits after travelling across said bottom surface from said flow-in end;
   a load beam for abuttingly supporting said slider,
   said load beam being abuttedly contacted, via a touch member connected thereto, to a predetermined surface position of said slider for exerting a loading force thereto, in the direction toward the recorded surface; and
   a gimbal coupled at a first position thereof to a first end of said load beam and at a second position thereof to one end of said slider,
   said gimbal flexibly supporting said slider so as to provide free angular movement in two directions, about a first rotational axis defined by a tangential path of circular or spiral tracks on the recorded surface and about a second rotational axis defined by a radial path of circular or spiral tracks on the recorded surface,
   the second position being at a fixed distance closer to the flow-in end than to a center of gravity reference point of said slider, and
   the first position being at a fixed distance away from the second position and on an opposite position to the center of gravity reference point of said slider, with respect to this second position;
   wherein said touch member, connected to said load beam abuttingly contacting said slider, is provided such that in contact position said touch member is disposed substantially about an axis which passes through the center of gravity reference point and is normal to the recorded surface.

2. A floating head assembly comprising:
   a slider having:
   at least a leading end connected to a recording head; and
   a bottom surface facing a recorded surface of a disk-shaped recording medium,
   a small gap being provided therebetween from which an air-borne floating force is generated in a direction which extends from the recorded surface toward said bottom surface,
   the air-borne floating force being generated by laminar air flow caused by the revolution of said disk-shaped recording medium, and extending in a direction from a flow-in end to a flow-out end beneath the bottom surface and over the recorded surface,
   said flow-in end being defined with respect to a first end of said bottom surface where the laminar air flow first makes contact with the slider, and
   said flow-out end being defined with respect to a second end of said bottom surface where the laminar air flow exits after travelling across said bottom surface from said flow-in end;
   a load beam for abuttingly supporting said slider,
   said load beam being abuttedly contacted, via a touch member connected thereto, to a predetermined surface position of said slider for exerting a loading force thereto, in the direction toward the recorded surface, and
   a gimbal coupled at a first position thereof to a first end of said load beam and at a second position thereof to one end of said slider,
   said gimbal flexibly supporting said slider so as to provide free angular movement in two directions, about a first rotational axis defined by a tangential path of circular or spiral tracks on the recorded surface and about a second rotational axis defined by a radial path of circular or spiral tracks on the recorded surface,
   the second position being at a fixed distance closer to the flow-in end than to a center of gravity reference point of said slider, and
   the first position being at a fixed distance away from the second position and on an opposite position to the center of gravity reference point of said slider, with respect to this second position
   wherein said touch member, connected to said load beam abuttingly contacting said slider, is provided such that in contact position said touch member is disposed substantially about an axis which passes a center of the air-borne floating force and which axis is normal to the recorded surface.

3. A floating head assembly as in claim 1, wherein, at a point of contact with said slider, a contacting point of said touch member and the center of gravity reference point are coincident.

4. A floating head assembly as in claim 1, 2 or 3, wherein:
   said touch member has a hemispherical convex surface which radially protrudes from said load beam toward said slider; and
   said slider has a hemispherical concave surface part for receiving said touch member, a curvature of said hemispherical concave surface part being smaller than that of said hemispherical convex surface of said touch member.

5. A floating head assembly as in claim 1, 2 or 3, wherein:
   said touch member has a hemispherical convex surface which radially protrudes from said load beam toward said slider; and
   said slider has an oblong groove with parallel edges for receiving said hemispherical convex surface, said parallel edges being in a tangential direction relative to a circular track under said touch member.

6. A floating head assembly as in claim 1, 2 or 3, wherein said gimbal is configured such that the gimbal holds said slider in a position such that said touch member does not contact an upper surface of said slider when no air-borne floating force is acting on said slider.

7. A floating head assembly as in claim 1, 2 or 3, wherein said recording head is a magnetic head.

8. A floating head assembly as in claim 1, 2 or 3, wherein said recording head has an objective lens for converging laser light onto the recorded surface of said disk-shaped recording medium.

9. A floating head assembly as in claim 1 or 2, wherein said touch member has a hemispherical convex surface which radially protrudes from said load beam toward said slider.

* * * * *